Patented Feb. 11, 1941

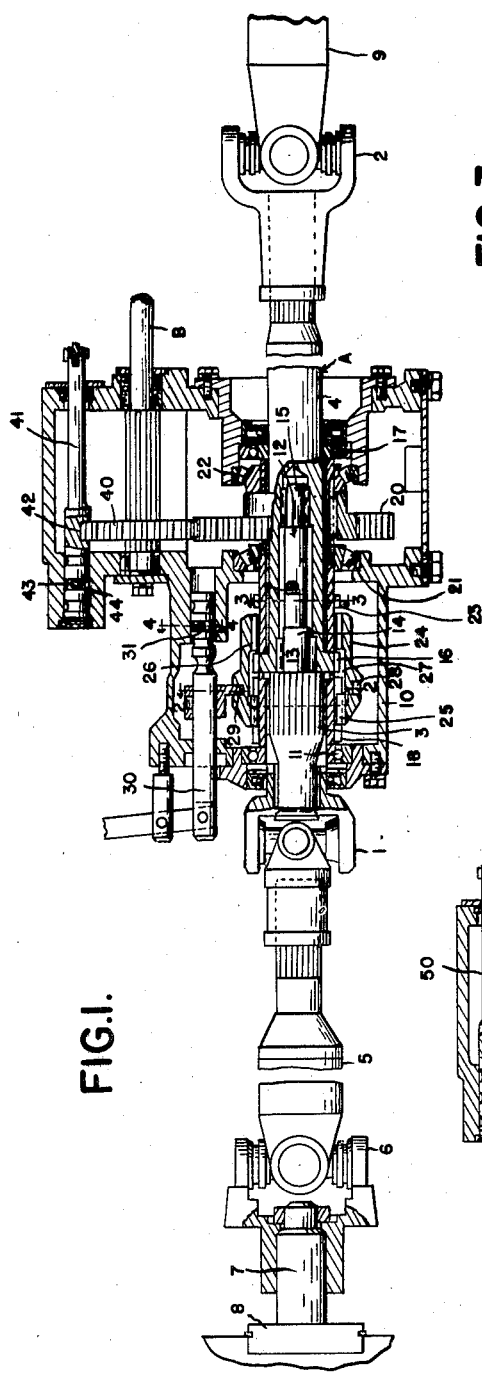

2,231,144

UNITED STATES PATENT OFFICE 2,231,144

POWER TAKE-OFF ASSEMBLY

Robert W. Wagner, Detroit, Mich., assignor to Detroit Harvester Company, Detroit, Mich., a corporation of Michigan Original application May 16, 1938, Serial No. 208,295. Divided and this application January 23, 1939, Serial No. 252,501

7 Claims. (Cl. 74—11)

This invention relates generally to motor vehicle power take-offs such as split propeller shaft power take-offs for trucks, and constitutes a division of my application filed May 16, 1938, bearing Serial No. 208,295.

One of the essential objects of the invention is to provide an assembly of this type wherein one or more power take-off shafts disposed substantially parallel to the propeller shaft may be operatively connected to the propeller shaft so as to be driven therefrom.

Another object is to provide an assembly wherein the operation of such power take-off shafts may be controlled by suitable shifter mechanism which preferably is separate from the shifter mechanism employed for controlling the operation of the driven section of the split propeller shaft.

Other objects, advantages and novel details of construction of this invention will be made more apparent as this description proceeds, especially when considered in connection with the accompanying drawing, wherein:

Figure 1 is a longitudinal horizontal sectional view through an assembly embodying my invention;

Figure 2 is a sectional view taken substantially on the line 2—2 of Figure 1;

Figure 3 is a sectional view taken substantially on the line 3—3 of Figure 1;

Figure 4 is a sectional view taken substantially on the line 4—4 of Figure 1;

Figure 5 is a fragmentary longitudinal sectional view showing a slight modification.

Referring now to the drawing, A is the propeller shaft, and B is the power take-off shaft of an assembly embodying my invention.

As shown, the propeller shaft A extends between two universal joints 1 and 2, respectively, and has two sections 3 and 4. As usual, a shaft 5 extends forwardly from the universal joint 1 to another universal joint 6 connected to a shaft 7 projecting rearwardly from the transmission 8 of an internal combustion engine (not shown), while a shaft 9 extends rearwardly from the universal joint 2 to the pinion gear of the rear axle assembly (not shown). Preferably the propeller shaft drive section 3 is provided within a suitable housing 10 with ball bearings 11 and has a reduced stepped portion 12 that is received within and extends axially of the driven section 4. Needle bearings 13 are provided about the steps 14 and 15, respectively, of the drive section 3 within the driven section 4. The driven section 4 is provided at its forward end with an integral toothed clutch member 16 and is provided within the housing 10 with ball bearings 17.

Splined upon the drive section 3 between the ball bearings 11 and the clutch member 16 is a sleeve-type toothed clutch member 18, while freely rotatable upon the driven section 4 between the clutch member 16 and the ball bearings 17 is a power take-off sleeve 19 upon which is keyed a spur gear 20. Encircling this sleeve 19 upon opposite sides of the spur gear 20 are roller bearings 21 and 22, respectively, which cooperate with the ball bearings 11 and 17 to maintain the stepped portion 12 of the drive section 3 in proper axial relationship to the driven section 4. Thus, the stepped portion 12 of the drive section serves in effect as a pilot within the driven section 4. Preferably there is ample clearance between the driven section 4 and the power take-off sleeve 19 to compensate for any inaccuracies in machining and any misalignment that may occur in assembly. Thus, no binding between the parts will take place.

Formed integral with the power take-off sleeve 19 at a point between the clutch member 16 and roller bearings 21 is a toothed clutch member 23 which, like the clutch members 16 and 18, is adapted to be encircled by a sliding clutch collar 24. Preferably this sliding clutch collar 24 is provided interiorly thereof with integral toothed clutch members 25 and 26 and an intermediate channel or recess 27, and is provided exteriorly thereof with an annular groove or channel 28 which is engaged by a shifter fork 29 fixed upon a shaft 30 slidable longitudinally in the housing 10. As shown, the arrangement is such that clutch member 25 will always be in engagement with clutch member 18 and may be engaged with clutch member 16 while in engagement with clutch member 18. Clutch member 26 is adapted to be alternately engaged with clutch members 16 and 23. Any suitable means (not shown) may be employed from a remote point, for example, from the dash or instrument board of the truck, for sliding shaft 30 longitudinally to cause collar 24 to be shifted longitudinally to the right or left so that the engagement of clutch members described above may be effected, while any suitable means, such as the spring pressed ball 31, may be employed to retain the shaft 30 in adjusted position.

Splined upon power take-off shaft B is a gear 40 adapted to mesh with gear 20 for driving the power take-off shaft B. 41 is a sliding shifter shaft having a recessed portion 42 straddling the gear 40 for shifting the latter to and from engagement with gear 20. A spring pressed ball 43 in the housing 10 is engageable with the grooves 44 in the shaft 41 to yieldably retain the said shaft in adjusted position. Any suitable mechanism (not shown) independent of the sliding shaft 30 may be connected to the outer end of shaft 41 to slide the same.

Thus, from the foregoing it will be apparent that the assembly as shown in Figure 1 is in neutral. When the collar 24 is shifted from neutral to the left so that clutch members 26 and 16 are in engagement with each other, then the drive is transmitted from the drive section 3 through clutch members 18 and 25, collar 24 and clutch members 26 and 16 to the driven section 4 to propel the rear wheels (not shown) of the truck. In this position the power take-off shaft B is idle. When the collar 24 is shifted from neutral position to the right so that clutch members 26 and 23 are in engagement with each other, then the drive is transmitted from the drive section 3 through clutch members 18 and 25, collar 24, gears 26 and 23 and power take-off sleeve 19 to spur gear 20. When gear 40 has been moved by shifter shaft 41 into mesh with gear 20, then the drive to the power take-off shaft B is complete. Thus, it is the manipulation of gear 40 by shifter shaft 41 that really controls the operation of the power take-off shaft B. When gear 40 is out of mesh with gear 20, and this may be accomplished at will by manipulation of shaft 41, the power take-off shaft B is idle. When collar 24 is shifted further to the right from the power take-off drive position just mentioned so that clutch member 25 will engage with clutch member 16 while clutch member 25 is in engagement with clutch member 18 and clutch member 26 is in engagement with clutch member 23, then the drive is transmitted from drive section 3 through clutch members 18, 25 and 16 to the driven section 4 and through clutch members 18 and 25, collar 24, clutch members 26 and 23 and power take-off sleeve 19 to spur gear 20. If gear 40 is in mesh with gear 20, then the power take-off shaft B, as well as the rear wheels of the truck are operated simultaneously.

In Figure 5 I have illustrated a slight modification in which two power take-off shafts $B^1$ and $B^2$ are provided at diametrically oppoiste sides of and substantially parallel to the propeller shaft $A^1$. If desired, shifter mechanisms such as 50 and 51, respectively, similar to that shown in Figure 1, may be independently operated to control the operation of the power take-off shafts $B^1$ and $B^2$. For example, shifter mechanism 50 may be operated to engage gear 53 on power take-off shaft $B^1$ with or to disengage it from gear 54 on the propeller $A^1$, while shifter mechanism 51 may be operated to engage gear 55 on the power take-off shaft $B^2$ with or disengage it from gear 54 on the propeller shaft $A^1$. When gear 53 is disengaged from gear 54, then power take-off shaft $B^2$ only will operate, providing, of course, that gear 55 is in mesh with gear 54. Likewise, when gear 55 is disengaged from gear 54, then power take-off shaft $B^1$ only will operate, providing gear 53 is in mesh with gear 54. When both gears 53 and 55 are in mesh with gear 54, then both power take-off shafts $B^1$ and $B^2$ will operate simultaneously.

What I claim as my invention is:

1. In a power take-off assembly, a propeller shaft having two sections, one being a drive section and the other a driven section, a clutch member fixed to the driven section, a clutch member non-rotatably mounted on the drive section, a power take-off sleeve freely rotatable upon the driven section, a power take-off gear fixed to said sleeve, a clutch member fixed to said sleeve, a sliding clutch collar encircling the first two mentioned clutch members and adapted to encircle the third mentioned clutch member, a clutch member rigid with said collar constantly in engagement with the second mentioned clutch member and adapted to engage with the first mentioned clutch member while in engagement with the second mentioned clutch member, another clutch member rigid with said collar adapted to alternately engage with the first and third mentioned clutch members, a power take-off shaft substantially parallel to the propeller shaft, a gear splined upon the power take-off shaft and engageable with the power take-off gear, and means for actuating the last mentioned splined gear.

2. In a power take-off assembly, a propeller shaft having two sections, one being a drive section and the other a driven section, a clutch member fixed to the driven section, a clutch member splined on the drive section, a power take-off sleeve freely rotatable upon the driven section, a power take-off gear fixed to said sleeve, a clutch member fixed to said sleeve, a sliding collar encircling the first two mentioned clutch members and adapted to encircle the third mentioned clutch member, a clutch member rigid with said collar constantly in engagement with the second mentioned clutch member and adapted to engage with the first mentioned clutch member while in engagement with the second mentioned clutch member, another clutch member rigid with said collar adapted to alternately engage with the first and third mentioned clutch members, a power take-off shaft operatively connected to the power take-off gear, and a second power take-off shaft operatively connected to the power take-off gear.

3. In a power take-off assembly, a propeller shaft having two telescopically arranged sections, one being a drive section and the other a driven section, a clutch member fixed to the driven section, a clutch member non-rotatably mounted on the drive section, a power take-off sleeve freely rotatable on the driven section, a clutch member fixed to the power take-off sleeve, a sliding collar encircling the second mentioned clutch member and power take-off sleeve and provided with longitudinally spaced integral clutch members, one of the spaced clutch members being always in engagement with the second mentioned clutch member and adapted while in engagement therewith to also engage with the first mentioned clutch member, the other of said spaced clutch members being between and adapted to alternately engage with the first mentioned clutch member and the third mentioned clutch member, means for sliding said collar relative to the first, second and third mentioned clutch members, a spur gear keyed upon said power take-off sleeve, and means for driving one or more power take-off shafts from said spur gear.

4. In a power take-off assembly, a propeller shaft having two telescopically arranged sections, one being a drive section and the other a driven section, a clutch member fixed to the driven section, a sleeve type clutch member non-rotatably mounted on the drive section beside the first mentioned clutch member, a power take-off sleeve freely rotatable on the driven section, a clutch member fixed to the power take-off sleeve, a sliding collar encircling the second mentioned clutch member and power take-off sleeve and provided with longitudinally spaced integral clutch members, one of the spaced clutch members being always in engagement with the second mentioned clutch member and adapted while in engagement therewith to also engage with the first mentioned clutch member, the other of said spaced clutch members being between and adapted to alternately engage with the first mentioned clutch member and the third mentioned clutch member, means for sliding said collar relative to the first, second and third mentioned clutch members, a spur gear keyed upon said power take-off sleeve, a power take-off shaft substantially parallel to the propeller shaft, and a gear splined on the power take-off shaft and adapted to mesh with the spur gear aforesaid.

5. In a power take-off assembly, a propeller shaft, a power take-off sleeve freely rotatable upon a part of the propeller shaft, two power take-off shafts substantially parallel to said propeller shaft, means for driving the sleeve from the propeller shaft, and means for driving both power take-off shafts simultaneously or either of them independently of the other, including a gear rigid with said sleeve, and gears splined on the respective power take-off shafts and movable into and out of engagement with the gear rigid with said sleeve.

6. In a power take-off assembly, a propeller shaft having two sections, one being a drive section, and the other a driven section, a power take-off sleeve freely rotatable upon the driven section, a power take-off gear fixed to said sleeve, means for driving the driven section of the propeller shaft and said sleeve from the drive section of the propeller shaft, two power take-off shafts substantially parallel to said propeller shaft, and means for driving both power take-off shafts simultaneously or either of them independently of the other, including gears splined upon the respective power take-off shafts and movable into and out of engagement with the gear fixed to said power take-off sleeve.

7. In a power take-off assembly, a propeller shaft, two power take-off shafts substantially parallel to said propeller shaft, a gear freely rotatable upon the propeller shaft, means for driving said gear from the propeller shaft, and means for driving both power take-off shafts simultaneously or either of them independently of the other, including gears splined upon the power take-off shafts and movable into and out of engagement with the gear on the propeller shaft.

ROBERT W. WAGNER.